United States Patent

Rosenberg

[11] Patent Number: 5,274,751
[45] Date of Patent: Dec. 28, 1993

[54] SYSTEM AND METHOD FOR PRINTING GRAPHIC OBJECTS

[75] Inventor: Andrew S. Rosenberg, Redmond, Wash.

[73] Assignee: Microsoft Corporation, Redmond, Wash.

[21] Appl. No.: 776,798

[22] Filed: Oct. 15, 1991

[51] Int. Cl.⁵ .............................. G06F 15/62
[52] U.S. Cl. .......................... 395/117; 395/102; 395/106; 395/128
[58] Field of Search ........ 395/102, 106, 117, 127–129; 358/447, 457

[56] References Cited

U.S. PATENT DOCUMENTS

| | | | |
|---|---|---|---|
| 4,862,387 | 8/1989 | Lee | 395/102 |
| 5,025,325 | 6/1991 | Hudson | 358/447 |
| 5,111,532 | 5/1992 | Seki et al. | 395/102 |

Primary Examiner—Heather R. Herndon
Assistant Examiner—Almis Jankus
Attorney, Agent, or Firm—Seed and Berry

[57] ABSTRACT

A system and method for converting coordinates on a computer graphics system so that objects drawn on a computer display screen will have the dimensions and location intended by the user when the object is printed. The user draws lines on the display screen, with the lines being aligned with marks on rulers which are also displayed along each axis of the display screen. The ruler marks are labeled in units, such as millimeters, which are often impossible to accurately display on the computer screen. The system then converts the coordinates to a high resolution coordinate system value that corresponds to the position and size of the object in relation to the labeled marks on the ruler. When the display screen is printed, the object is printed in accordance with the labels on the rulers rather than the displayed image of the object on the computer screen. Similarly, the high resolution value for the intended length of the object is used to display the image on the screen relative to the ruler when the object is moved about on the screen. The method may be easily implemented on a computer using graphics or desktop publishing software.

14 Claims, 4 Drawing Sheets

SYSTEM AND METHOD FOR PRINTING GRAPHIC OBJECTS

TECHNICAL FIELD

The present invention relates generally to a system and method for more accurately printing objects on the printed page when screen resolution does not permit an accurate display or alignment of the object on the computer screen.

BACKGROUND OF THE INVENTION

Computer graphics systems have become a common tool in the workplace. Graphic images can be created on the computer display screen by a variety of application and desktop publishing programs. Frequently, the user wishes to create objects such as lines that are evenly spaced as referenced to a ruler, or boxes that butt up against one another. While the lines may appear evenly spaced on the computer screen, they are often not evenly spaced when the image is transmitted to a laser printer. Similarly, boxes that appear to butt up against one another on the screen in perfect alignment are either overlapping or do not touch each other when the image is transmitted to the printer.

The reason for this problem is that computer display screens have a resolution that is substantially less than the resolution of a typical laser printer. A typical computer terminal has a resolution of 72 or 96 dots per inch (dpi), while a typical laser printer has a resolution of 300 dpi or even 600 dpi. The computer system must perform some calculations to translate the image on the low resolution computer screen to the high resolution of the printer. When the user is working in a system that uses inches as the unit of measurement, 96 dpi is a convenient resolution because there is an integral number of video dots per unit of length measurement. For a 96 dpi display there are 6 dots of video display per 1/16 inch. However, if the user has a video terminal with a different resolution, or is working in the metric system or some other scale of measurement, there may not be an integral number of dots per unit of the length measurement used. For example, a video terminal with a resolution of 96 dpi will result in a resolution of 3.78 dots per millimeter if the user is in the metric system. Computer systems round off this value, for purposes of display on the screen, to an integral number of dots per millimeter, with some millimeter intervals represented by 3 dots of video display while other millimeter intervals are represented by 4 dots of video display. When a ruler is displayed on the screen to assist the user in drawing and moving objects, the marks on the ruler which represent the units of length measurement do not have a uniform displayed size. For example, some displayed millimeter marks will be 3 dots apart and others will be 4 dots, and none will be precisely 1 millimeter apart. As a result precise measurement and location of objects on the screen is not possible beyond the screen resolution.

Similarly, when an object is moved from one location on a display screen to a new location, the object will maintain the same size as initially drawn on the display screen but might not seem to be the same size when measured by the ruler. The same unit of length measurement, when measured by the ruler at the new location, may not be represented by the same number of dots. This problem is also encountered when attempting to draw two objects to have the same size at different locations on the display screen when the units of length measurement on the ruler have a different displayed length at the two locations. Although the two objects appear to have the same size when measured by the ruler, they will print out with different sizes. Similarly, if one object is drawn and then moved to the location of another object that is drawn to be the same size as measured by the ruler marks, the two objects will be displayed as having different sizes.

It will, therefore, be appreciated that there is a significant need for a computer system that will allow the user to generate objects on a display screen, move the objects about the screen, and print the objects accurately on a printer. The present invention fulfills these needs, and further provides other related advantages.

SUMMARY OF THE INVENTION

The present invention resides in a system and method for converting coordinates on a computer graphics system where the selected units of length measurement may not be accurately represented on the computer display screen. The system displays a ruler with marks labeled to indicate the selected units of length measurement relative the ruler origin. The system calculates absolute location values for the marks on the ruler to indicate the actual intended units of length measurement rather than the inaccurately displayed units of measurement.

When an object is aligned with a particular mark, the object is given an absolute location value associated with that particular mark. The system translates the absolute location value associated with the object into a printer value so that an object, which is drawn to dimensions indicated by the marks on the displayed ruler, will be printed out with the intended dimensions in spite of the inherent inaccuracies of the display screen. The printer value transmitted to the printer represents the intended dimension of the object rather than the inaccurately displayed dimension of the display screen.

When an object is not aligned with a particular mark on the displayed ruler, the system interpolates between the marks immediately adjacent to the location of the object in order to calculate an estimated absolute location value of the object.

The computer system also allows an object to be moved from one location of the display screen to a new location while maintaining the correct intended dimensions of the object despite its being moved. The system calculates absolute location values for the object at the original screen location and determines a new displayed size so that the displayed size of the object at the new screen location corresponds to ruler marks at the new location, corresponding to the intended dimensions. Thus, an object with specific dimensions, when measured by the displayed ruler, in the original location on the screen will have the same specific dimensions, when measured by the displayed ruler, after the object is moved to a new location on the screen. When the object is printed by a printer, it will be accurately printed even though the object has been moved on the screen between portions of the ruler with differences in the displayed unit of measurement that result from the resolution limitations of the display screen. If the same object is drawn at two locations with the same length as measured by the ruler, the printer will print the two objects with the same dimensions even though the objects are located on different portions of the display screen and appear to have different lengths as a result of the resolution limitations of the display screen.

The method of converting coordinate systems involves the steps of generating a graphics ruler on the computer screen, with the ruler having an origin located anywhere on the screen, marks having a nonuniform spacing, and labeling some of the marks in the desired unit of length measurement. The invention also includes a method of measuring the intended location of the object by determining with which ruler mark the object is aligned and then calculating the intended location of the object by calculating the absolute location of the ruler mark relative to the origin. The absolute location value is assigned to the object to indicate the intended location of the object. When the object is printed, a method is provided for translating the absolute location values into printer data values and transmitting these data values to the printer.

DETAILED DESCRIPTION OF THE INVENTION

As shown in the drawings for purposes of illustration, the present invention is embodied in a system and method for converting coordinates in a graphics computer system. The invention uses a high resolution coordinate system so that objects may be accurately printed and properly displayed with a proper relative size, even though the computer display screen may not be capable of accurately displaying the objects. Without the invention, the object may be printed or displayed inaccurately due to resolution limitations in the computer display screen.

A computer display screen is composed of a series horizontal lines of display. Each horizontal line is composed of dots of display called pixels. The vertical resolution of the display is determined by the number of lines on the screen, while the horizontal resolution is determined by the number of pixels on a line. The resolution of the video display screen of a computer is governed by speed and memory limitations of the hardware. For example, a typical computer display screen will have a resolution of 96 pixels or dots per inch (dpi). A computer graphics system often displays one or more rulers on the screen to aid the user in creating and positioning objects on the display screen. When the graphics computer uses inches as the unit of length measurement on the displayed ruler and a display screen with a 96 dpi resolution, the computer display screen will be accurate because the smallest unit of measurement will result in an integral number of pixels on the video screen (1/16th inch=6 pixels).

Figure 1A:
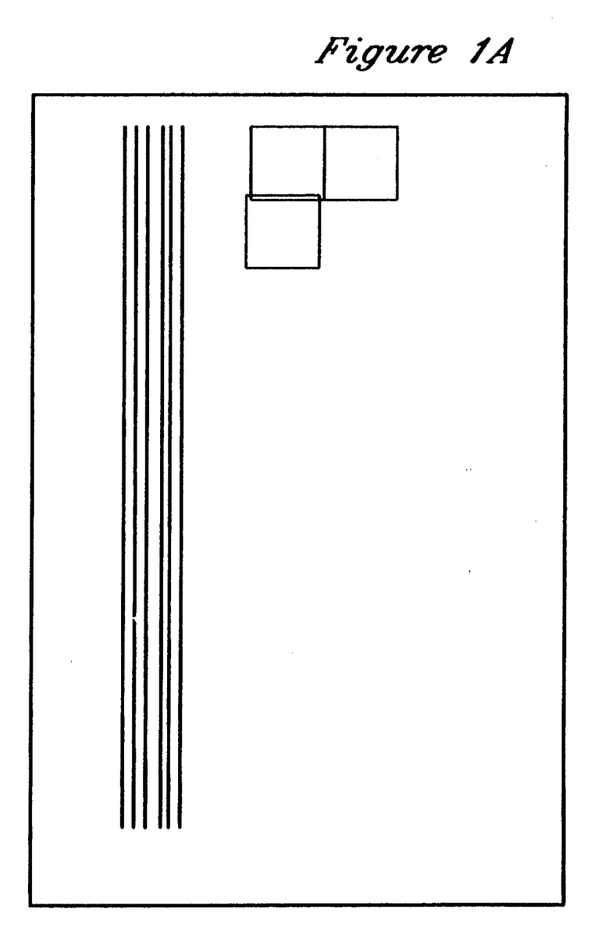
FIG. 1A depicts a printed output without use of the invention.
Figure 1B:
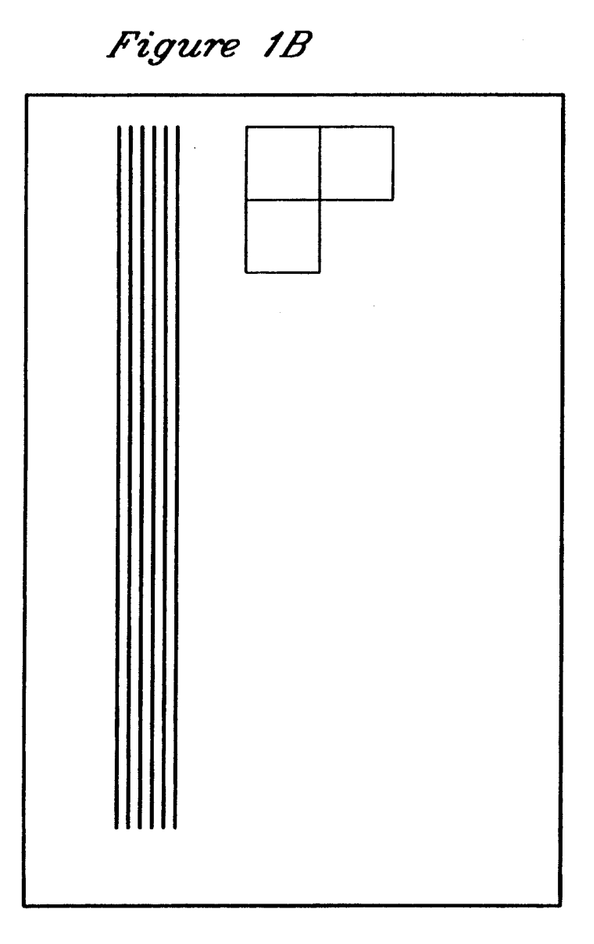
FIG. 1B depicts the printed output using the present invention.

If a different unit length of measurement such as millimeters is used, there is not an integral number of pixels on the display screen to accurately represent an object (1 mm=3.78 pixels). When the user chooses a unit length of measurement that cannot be accurately portrayed on a computer display screen, the system attempts to display the object correctly in the chosen units of length measurement. Graphics systems approximate the chosen unit length measurement by rounding off the number of pixels used to portray objects on the computer screen. With the example computer system described above, the result is that as you move across the screen, some millimeter intervals will be represented by 3 pixels, while other millimeter intervals will be represented by 4 pixels. Since systems generally perform their calculations in pixels, an object that looks correct on the screen, may be incorrect when printed onthe attached printer, as shown in FIG. 1A. Lines drawn with equal spacing as measured using the ruler will printout with unequal spacing. Objects positioned on the screen using the ruler so as to appear to have sides which align will not align when printed out. Similarly, when objects of the same intended size when drawn on different parts of the screen using the ruler are subsequently printed, the size of the objects will not be uniform or even correct because of the variation in the number of pixels per millimeter along the length of the ruler. The present invention compensates for these inaccuracies and allows an object to be printed with correct dimensions and in the correct position on the printed page, as shown in FIG. 1B, even though the ruler used to create and position objects has uneven displayed units of length measurement.

The computer system maintains a high degree of accuracy by performing calculations to determine "twip" values to represent the intended location of an object on the display screen. Twip is a well known term in the field of graphic arts and is defined as 1/20 of a point. There are 72 points per inch. Thus, there are 1440 twips in one inch. By performing all internal calculations in twips, the computer system has a degree of resolution that cannot be achieved by performing calculations in pixels.

It should be noted that even performing calculations in twips results in some error because there is not an integral number of twips per millimeter. However, the amount of error when using twips is significantly less than the error resulting from using pixels as the basis for calculations. Thus, the degree of error is acceptable when using twips for internal calculations. Alternatively, internal measurements could be performed in any chosen units that give the desired degree of resolution greater than the resolution of the display screen or printer.

Figure 2:
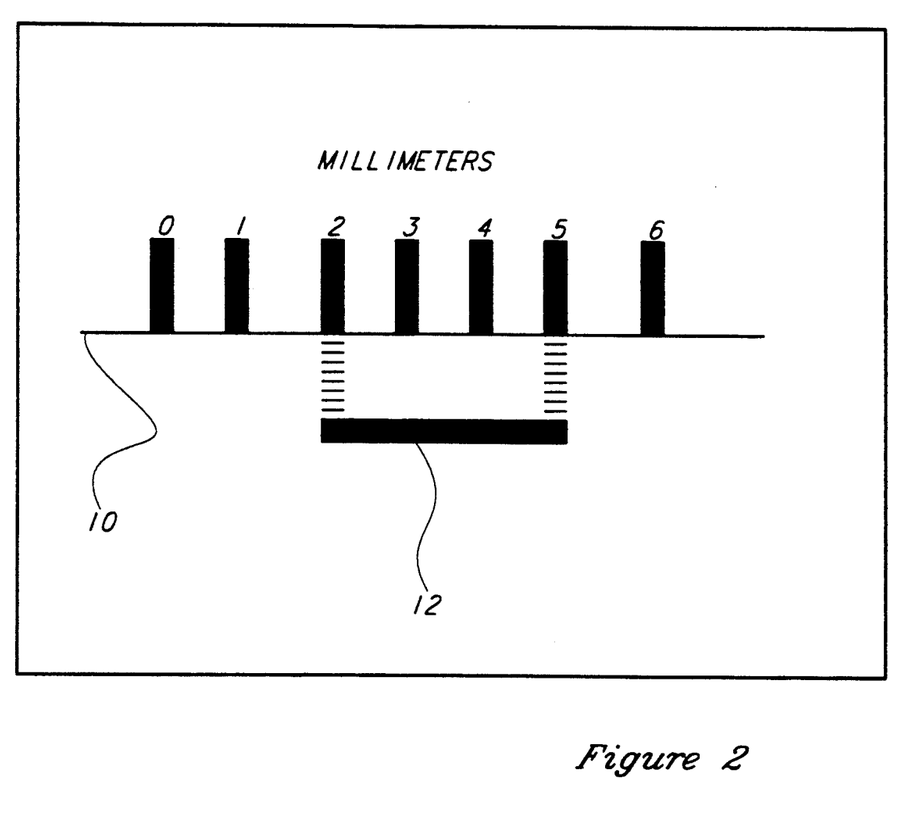
FIG. 2 shows an exaggerated view of a graphics ruler with marks having nonuniform intervals.

The system displays a ruler 10 on the computer screen to allow for dimensioning and positioning of objects. The ruler has an origin and a series of marks, some of which are labeled in the selected units of length measurement relative to the origin of the ruler, as shown in FIG. 2. The marks on the ruler indicate the desired or intended units of length measurement. As can be seen in FIG. 2, the marks on the ruler are not displayed at uniform intervals on the computer screen due to limitations in screen resolution in spite of being labeled as if the marks are at uniform intervals. The nonuniform intervals are a result of the computer display screen limitations discussed above. The present system does not attempt to make the screen image appear precise, but rather, concentrates on producing an accurate printed image and maintaining proper displayed size relative to the ruler.

It should be noted that, for the sake of simplicity, the discussion is centered around a single ruler on the computer screen. However, the invention is equally useful for both the horizontal and vertical axes of the display screen. Rulers may be displayed along both axes of the display screen to allow an object of exact dimensions to be precisely drawn and positioned on the screen.

The ruler marks on the display screen are represented internally by absolute location values as measured in twips. These absolute location values are stored in memory and used in the manner described below. The absolute location indicates the intended position of the marks, in the chosen units of length measurement, relative to the origin of the ruler 10. When an object starts and ends on a ruler mark, the system knows the intended length of the object and assigns the twip value for those ruler marks to the object. In FIG. 2, for example, when a line 12 is drawn between the 2 and 5 millimeter marks on the ruler, the system determines that the intended length of the object is 3 millimeters based upon the twip values for those ruler marks and without regard for the actual displayed spacing between those marks. Further, the system recognizes that the user intends the line to start at 2 millimeters from the origin even though the 2 millimeter mark on the ruler is actually not displayed precisely at a 2 millimeter distance from the origin. The absolute location value thereby compensates for the inherent inaccuracy of the computer display screen. The result is that the objects are recognized by the system as being of an intended length and at an intended position as measured by the ruler marks, and are not dependant on the actual displayed spacing between the marks. This permits the system to print an object accurately even though it is impossible to display the object accurately due to limitations in screen resolution.

The origin of the ruler 10 may be located at any screen position. For example, if the screen edge and the paper edge are the same, the ruler origin could be at the left edge of the screen, in which case all measurements will be reference to the ruler origin at the left edge of the paper. However, the origin of the ruler could be at any other location. For example, if the origin were located 2 centimeters from the left edge of the screen, all measurements will be referenced to the ruler origin 2 centimeters from the left edge of the paper when printed. The origin could also be in the middle of the screen using positive and negative number labels for the marks to indicate their position with respect to the origin. The system calculates the number of twips required to locate the origin of the ruler in the specified location and uses that value as a reference. If the origin is moved after an object is created, the object will automatically be moved relative to the origin. For example, if a line is drawn from the 3 millimeter mark to the 6 millimeter mark, and the ruler origin is then moved to the 2 millimeter mark, the line will now appear to be drawn from 1 millimeter to 4 millimeter.

In one embodiment of the invention, the system calculates, in twips, the absolute location of all the ruler marks relative to the origin. The absolute location values of the marks may be stored in memory within the computer system in a look-up table, a well known device for storing data. When the object is aligned with a mark, the system looks up the absolute location value associated with that particular mark and assigns that absolute location value to the object.

Alternatively, the presently preferred system waits until the object is created and determines with which ruler mark the object is aligned. The system then calculates the absolute location value in twips for that particular mark and assigns that twip value to the object.

When an object is created on the display screen, the user may manually align the object with a mark on the displayed ruler 10. Many system use a feature known as a "snap to ruler" option in which the system automatically aligns the object with the nearest ruler mark. For example, if the left end of a line is drawn close to the 2 millimeter ruler mark, the computer system treats it as drawn at the 2 millimeter mark and displays it as such.

Figure 3A:
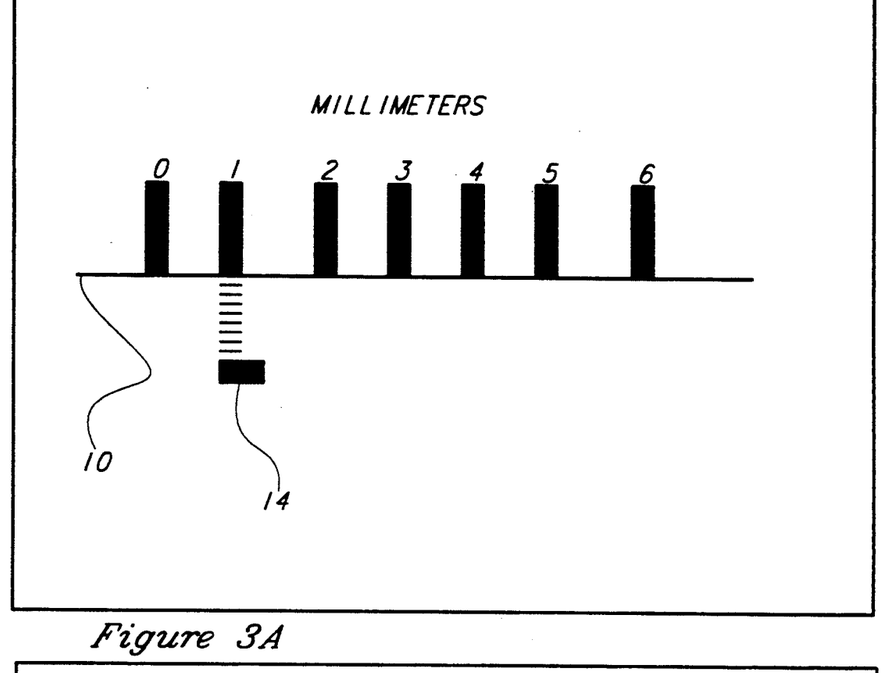
FIG. 3A shows an object in alignment with the 1 millimeter mark on the displayed ruler of FIG. 2.

When an object is aligned with one of the marks on the ruler 10, the object is assigned an absolute location value associated with that particular mark. As shown in FIG. 3A, an object 14 is aligned with the 1 millimeter mark on the ruler. Therefore, the object is assigned the same absolute location value associated with the 1 millimeter mark (i.e., 56 twips from the ruler origin). Since the object was positioned at the 1 millimeter ruler mark by the user, this absolute location value represents a very precise measurement of the object's intended position even though its displayed position is more or less than 1 millimeter from the origin as a result of display screen limitations. When the screen is printed on a printer, the object will be printed at a position exactly 1 millimeter from the selected origin based on its absolute location value, not its actual screen spacing from the origin, which can be in error by 1 or more pixels (i.e., about 15 or more twips).

Figure 3B:
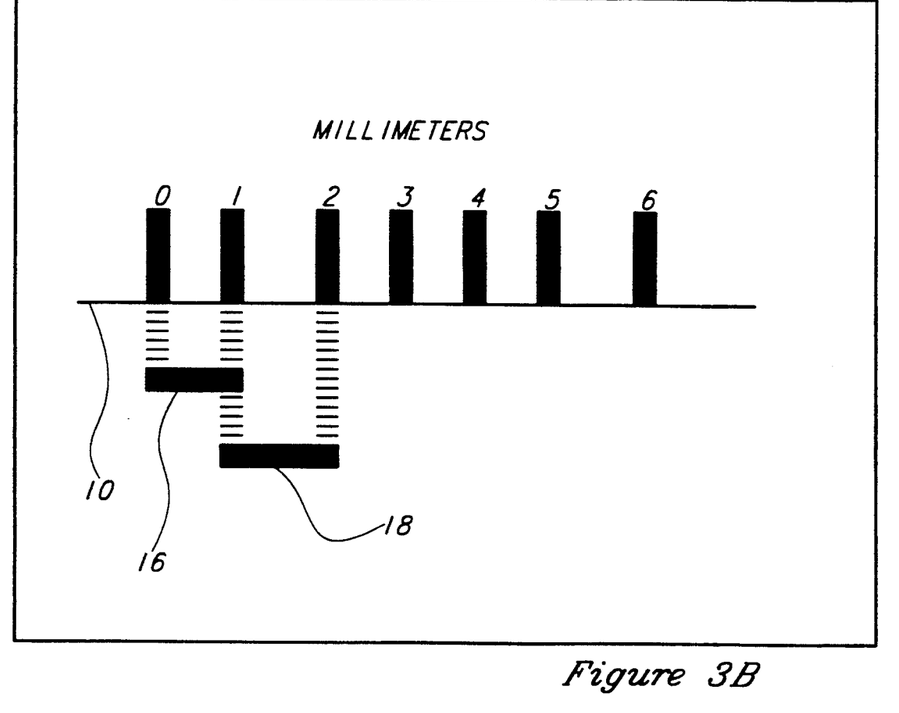
FIG. 3B shows two separate lines drawn from 0 to 1 millimeters and from 1 to 2 millimeters, respectively, using the marks on the displayed ruler of FIG. 2.

Similarly, in FIG. 3B, there are two 1 millimeter lines 16 and 18 drawn from 0 to 1 and from 1 to 2 millimeters, respectively. Although the degree of error has been exaggerated to illustrate the point, it can be seen that the lines are not of equal displayed length on the screen, even though they purport to be of equal length as measured by the ruler. Again, this is the result of limitations in screen resolution. Because the lines begin and end on ruler marks, the system recognizes that the lines are intended by the user to be of equal length and are intended by the user to be located and extend from 0 to 1 millimeters and from 1 to 2 millimeters relative to the ruler origin. Therefore, the system will assign the very precise twip values corresponding to the ruler marks aligned with the start and end points of each line and hence the user's intended position for the lines. When the screen is printed out, the lines will both be 1 millimeter in length and precisely located on the printed page.

The system determines the object alignment with a particular mark (a ruler mark is generally 1 pixel wide) by determining the cursor location when the object is created. For example, the user may draw an object such as a line, on the screen using a computer pointing device such as a mouse. When the user depresses a button on the mouse, the system determines which pixel the mouse cursor was aligned with when the button was depressed. The system uses the pixel value of the mouse cursor to determine with which one of the ruler marks the cursor was aligned when the button was depressed. With a "snap to ruler" option, the closest ruler mark will be selected.

Figure 4:
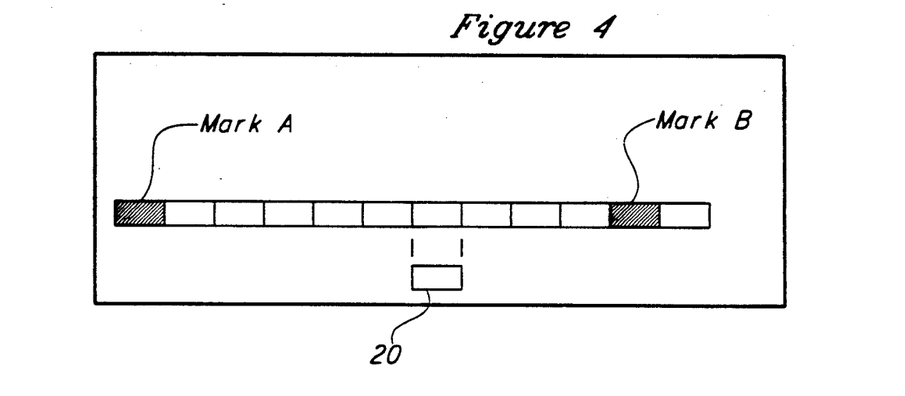
FIG. 4 shows an enlarged view of the ruler of FIG. 2 to illustrate the manner in which location values are determined if an object is not aligned with a ruler mark.

If the object on the display screen is not aligned with a ruler mark which can occur when the "snap to ruler"

option is not used, the system cannot accurately determine the intended location of the object. The system therefore interpolates between the immediately adjacent marks on the ruler 10 and calculates an estimated absolute location value, as shown in FIG. 4. An object 20 in FIG. 4 is located 6/10 of the way between a mark "A" and a mark "B". Therefore, the system calculates a twip value corresponding to that location as an estimated absolute location value. Since the object is not perfectly aligned with the ruler mark in this situation, the results are not as accurate as when the object is aligned with a ruler mark.

With conventional computer systems, because of the nonuniform intervals between ruler marks, an object may appear to change length on the display screen when measured by the ruler if the object is moved across the screen. Without the present invention, a typical computer system counts pixels to determine an object's dimensions and location. The object's dimension when moved is remembered in pixels and displayed accordingly at the new location. The inherent inaccuracy in the display screen causes an inaccurately printed page and display.

The present invention allows objects to be moved to any location on the screen without altering the dimensions of the printed object. However, because the ruler marks do not have uniform intervals on the computer screen, the displayed length of the object will appear to change when it is moved. This is accomplished by knowing the intended length of the object. When an object is created, the system determines the intended location by virtue of the alignment of the object with a ruler mark. The intended length of an object is determined by calculating the difference between the start and end points of the object in twips. If the object is subsequently moved, the system calculates the new intended location, in twips, by virtue of the alignment of the object with a new ruler mark.

Figure 5:
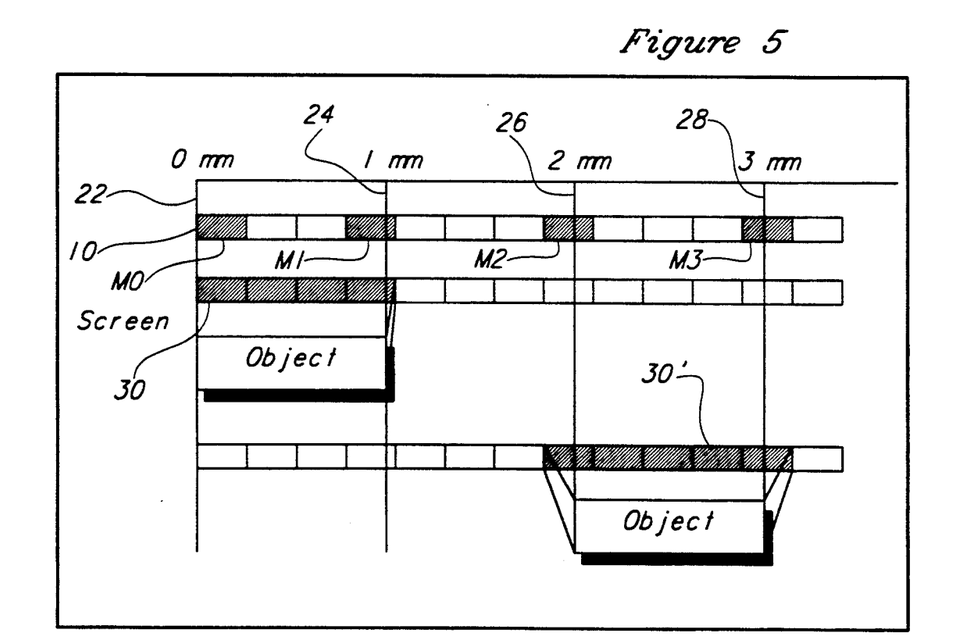
FIG. 5 shows objects with different displayed lengths when aligned with different ruler marks on the displayed ruler of FIG. 2.

The intended unit of length measurements generally do not fall precisely on the start of a pixel. When an intended unit of length measurement falls within a particular pixel, that pixel is lighted on the displayed ruler. If the intended unit of length measurement falls precisely on the boundary between two pixels, the pixel to the right of the intended unit of length measurement is lighted. For example, the intended location for 0 millimeters 22 in FIG. 5 is precisely on a pixel boundary, so the system will light the pixel to the right for the displayed ruler mark M0. In contrast, the intended locations 24, 26, and 28 for the 1, 2, and 3 millimeter marks M1, M2, and M3, respectively, fall within pixel boundaries on the display screen, thus the pixel corresponding to the 1, 2, and 3 millimeter marks will be lighted.

As a result of the pixel lighting algorithm described above, the intervals between marks on the displayed ruler 10 may vary. Note that the interval between the 0 millimeter mark M0 and the 1 millimeter mark M1 comprises four pixels, while the interval between the 2 millimeter mark M2 and the 3 millimeter mark M3 comprise five pixels. Thus, an object 30 drawn between the 0 and 1 millimeter marks on the displayed ruler will have a different displayed length than an object 30' with the same intended dimensions but drawn between the 2 and 3 millimeter marks. Similarly, if the object 30 were drawn between the 0 and 1 millimeter marks and subsequently moved to the location of the object 30' between the 2 and 3 millimeter marks, the object would have a larger displayed size. If the object 30' were moved to the location of the object 30, the object would be displayed with a smaller size. However, the system performs all calculations in twips based on intended locations and dimensions of objects rather than displayed locations and dimensions.

When an object 30 is drawn between the 0 and 1 millimeter marks on the displayed ruler, the system calculates twips values corresponding to the intended location of the object rather than the displayed position of the object. The system can calculate the intended length of the object in twips by determining the difference between the twip values for the ends of the object. If the object 30 is moved to a location between the 2 and 3 millimeter marks, the system calculates the new intended location in twips. The system calculates twip values for the intended location of the object between the intended location for 2 millimeters 26 and the intended location for 3 millimeters 28. The displayed size of the object will appear larger for object 30' because the system will light all pixels in between the 2 and 3 millimeter marks corresponding to the displayed length of the object. As previously discussed, the intervals on the displayed ruler may vary. Thus, an object's displayed size will correspond to the displayed ruler marks and may vary even though the object's intended length does not vary. When the object is subsequently printed, the system will print the object based on the intended length and position as measured in twips. Thus, printed objects will maintain accurate dimensions and locations after being moved to a new location on the display screen even though the displayed size of the object may vary.

When the object is to be printed on a graphics printer connected to the system, the absolute locations values that represent the object dimensions and position must be translated into printer values that correspond to the intended dimensions and position on the printed page. Graphics printers are often laser printers with graphics capability. Such system have resolutions that far exceed the resolution of a typical display screen. Resolutions of 300 dpi or even 600 dpi are common. Since a computer system using the present invention has a higher resolution expressed in twips than a typical printer, it can translate the absolute location values into printer values with a typical error of only one printer pixel.

In operation, the invention displays a ruler 10 that has an origin, located anywhere on the screen, and ruler marks at nonuniform intervals that result from limitations in screen resolution. The ruler is labeled as though the marks were at uniform intervals. When an object is aligned with a mark on the ruler, the object is assigned an absolute location value corresponding to that mark. The size of the object intended by the user is determined based on the ruler at the existing location. If the object is moved to a new screen location, the system of the invention will correct the displayed size of the object so that the object aligns with ruler marks at the new screen location which correspond to the intended size of the object. Thus, the object may be created with precise dimensions and precisely located by aligning the object with the ruler marks. When the object is printed out, the object will be the correct size and location intended by the user when creating and positioning the object relative to the ruler and to other objects created and positioned relative to the ruler. The unacceptably large error inherent in prior art pixel based measurement systems is avoided.

It will be appreciated that, although specific embodiments of the invention have been described herein for purposes of illustration, the various modifications may be made without departing from the spirit or scope of the invention. Accordingly, the invention is not limited except by the appended claims.

I claim:

1. A computer system for accurately printing on a graphics printer a graphic object displayed on a computer display screen, the display screen being unable to accurately represent visually a selected unit of length measurement, said system comprising:

means for generating a ruler on the display screen, said ruler having an origin and a series of marks, said marks being displayed at nonuniform spacings along the length of said ruler and at least some of said marks having a labeled value indicative of an intended uniform spacing of said marks along the length of said ruler relative to said origin and expressed in the selected unit of measurement;

means for calculating intended location values of said marks, said intended location values corresponding to said intended uniform spacing of said marks along the length of said ruler relative to said origin;

measurement means for determining an intended location of the object displayed on the display screen by determining a particular one of said marks with which the object is aligned, and assigning to the object aligned with said particular mark an intended location value corresponding to said particular mark;

translating means for determining a printer location value for the object, said printer location value being related to said assigned intended location value for the object; and means for transmitting said printer location value to the printer.

2. The system of claim 1 wherein if the object is not aligned with one of said marks on said ruler, said measurement means estimates said intended location of the object on the display screen by interpolation between said marks immediately adjacent to the object and assigns an intended location value corresponding to said estimated intended location.

3. A computer system for accurately printing on a graphics printer a graphic object displayed on a computer display screen, the display screen being unable to accurately represent visually a selected unit of length measurement, said system comprising:

means for generating a ruler on the display screen, said ruler having an origin and a series of marks, said marks being displayed at nonuniform spacings along the length of said ruler and at least some of said marks having a labeled value indicative of an intended uniform spacing of said marks along the length of said ruler relative to said origin and expressed in the selected unit of measurement;

measurement means for determining an intended location of the object displayed on the display screen by determining a particular one of said marks with which the object is aligned;

means for calculating an intended location value of said particular mark with which the object is aligned and assigning to the object said intended location value, said intended location value corresponding to said intended uniform spacing of said particular mark and the object relative to said origin;

translating means for determining a printer location value for the object, said printer location value being related to said assigned intended location value for the object; and means for transmitting said printer location value to the printer.

4. A computer system for moving a graphic object displayed on a computer display screen across the screen from an original screen location to a new screen location, the display screen being unable to accurately represent visually a selected unit of length measurement, the object having first and second ends, said system comprising:

means for generating a ruler on the display screen, said ruler having an origin and a series of marks, said marks being displayed at nonuniform spacings along the length of said ruler and at least some of said marks having a labeled value indicative of an intended uniform spacing of said marks along the length of said ruler relative to said origin and expressed in the selected unit of measurement, at least some of the displayed spacings between said marks at the original screen location being of a different length than at least some of the displayed spacings between said marks at the new screen location;

means for calculating intended location values of said marks, said intended location values corresponding to said intended uniform spacing of said marks along the length of said ruler relative to said origin;

measurement means for determining a first one of said marks with which the first end of the object is aligned when at the original screen location, assigning an original intended location value corresponding to said first mark to the first end of the object, determining a second one of said marks with which the second end of the object is aligned when at the original screen location, and assigning an original intended location value corresponding to said second mark to the second end of the object, the object having an original displayed length measured from said first mark to said second mark, and for determining a third one of said marks with which the first end of the object is aligned when at the new screen location, and assigning a new intended location value corresponding to said third mark to the first end of the object;

dimension measurement means for determining an intended length of the object based on said intended location values assigned to the first and second ends of the object when at the original screen location; and resizing means for displaying the object with a new displayed length on the display screen after the object is moved to the new screen location, said resizing means calculating said new displayed length based on said new intended location value and on said intended length of the object, such that even if said original displayed length when at the original screen location is different from said new displayed length when at the new screen location, said intended length of the object when measured by said marks on said ruler remains unchanged.

5. The system of claim 4 having a printer coupled thereto, wherein said system further includes means for translating said new intended location value for the object into a printer location value, and means for transmitting said printer location value to the printer.

6. The system of claim 4 wherein if the first or second or both ends of the object are not aligned with ones of said marks, said measurement means estimates said intended location value for the end of the object not aligned with one of said marks by interpolating between said marks immediately adjacent to the end of the object not aligned with one of said marks, and assigns said intended location value to the end of the object not aligned with one of said marks.

7. In a computer graphics system having a computer, a display screen, and a printer, a method of converting coordinates of a graphics object for transmission to the printer, the display screen being unable to accurately represent visually a selected unit of length measurement, said method comprising:

generating a graphics ruler on the display screen, said ruler having an origin and a series of marks, said marks being displayed at nonuniform spacings along the length of said ruler and at least some of said marks having a labeled value indicative of an intended uniform spacing of said marks along the length of the ruler relative to said origin and expressed in the selected unit of measurement;

measuring an intended location of the object on the screen by determining a particular one of said marks with which the object is aligned;

calculating an intended location value for said particular mark with which the object is aligned;

assigning to the object said intended location value, said intended location value corresponding to said intended spacing of said particular mark and the object relative to said origin;

translating said intended location value assigned to the object into a printer location value for use in printing the object on the printer; and transmitting said printer location value to the printer.

8. The method of claim 7 wherein if the object is not aligned with one of said marks on said ruler, the method further includes the steps of estimating said intended location of the object by interpolating between said marks immediately adjacent to the object and assigning an intended location value corresponding to said estimated intended location.

9. The method of claim 7 wherein measuring said intended location by determining which of said marks is aligned with the object is accomplished by determining a pixel value that is coincidental with a screen location of the object and with said particular mark.

10. The method of claim 7 wherein calculating said intended location value includes determining a twip value of said particular mark.

11. In a computer graphics system having a computer, a display screen and a printer, a method for moving a graphic object displayed on the display screen across the display screen from an original screen location to a new screen location, the display screen being unable to accurately represent visually a selected unit of length measurement, the object having first and second ends, said method comprising:

generating a ruler on the display screen, said ruler having an origin and a series of marks, said marks being displayed at nonuniform spacings along the length of said ruler and at least some of said marks having a labeled value indicative of an intended uniform spacing of said marks along the length of said ruler relative to said origin and expressed in the selected unit of measurement, at least some the displayed spacings between said marks at the original screen location being of a different length than at least some of the displayed spacings between said marks at the new screen location;

calculating intended location values of said marks, said intended location values corresponding to said intended uniform spacing of said marks along the length of said ruler relative to said origin;

determining a first one of said marks with which the first end of the object is aligned when at the original screen location;

assigning an original intended location value corresponding to said first mark to the first end of the object;

determining a second one of said marks with which the second end of the object is aligned when at the original screen location;

assigning an original intended location value corresponding to with said second mark to the second end of the object;

determining a third one of said marks with which the first end of the object is aligned when at the new screen location;

assigning a new intended location value corresponding to said third mark to the first end of the object;

determining an intended length of the object based on said intended location values assigned to the first and second ends of the object when at the original screen location, the object having an original displayed length measured from said first mark to said second mark; and resizing the object to a new displayed length on the screen after the object is moved to the new screen location by calculating said new displayed length based on said new intended location value and on said intended length of the object, such that even if said original displayed length when displayed at the original screen location is different from said new displayed length at the new screen location, said intended length of the object when measured by said marks on said ruler remains unchanged.

12. The method of claim 11 wherein a printer is coupled thereto, said method further including translating said new intended location value for the object into a printer location value, and transmitting said printer location value to the printer.

13. The method of claim 11 wherein if the first or second or both ends of the object are not aligned with ones of said marks, the method further includes the steps of estimating said intended location value for the end of the object not aligned with one of said marks by interpolating between said marks immediately adjacent to the end of the object not aligned with one of said marks, and assigning said intended location value to the end of the object not aligned with one of said marks.

14. In a computer graphics system having a computer, a display screen and a printer, a method for moving a graphic object displayed on the display screen across the display screen from an original screen location to a new screen location, the display screen being unable to accurately represent visually a selected unit of length measurement, the object having first and second ends, said method comprising:

generating a ruler on the display screen, said ruler having an origin and a series of marks, said marks being displayed at nonuniform spacings along the length of said ruler and at least some of said marks having a labeled value indicative of an intended uniform spacing of said marks along the length of said ruler relative to said origin and expressed in the selected unit of measurement, at least some of the displayed spacings between said marks at the original screen location being of a different length than at least some of the displayed spacings between said marks at the new screen location;

determining a first one of said marks with which the first end of the object is aligned when at the original screen location;

calculating a first intended location value for said first mark, said first intended location value corresponding to said intended spacing of said first mark and the first end of the object relative to said origin;

assigning said first intended location value to the first end of the object;

determining a second one of said marks with which the second end of the object is aligned when at the original screen location;

calculating a second intended location value for said second mark, said second intended location value corresponding to said intended spacing of said second mark and the second end of the object relative to said origin;

assigning said second intended location value to the second end of the object;

determining a third one of said marks with which the first end of the object is aligned when at the new screen location;

calculating a third intended location value for said third mark, said third intended location value corresponding to said intended spacing of said third mark and the first end of the object when at the new screen location relative to said origin;

assigning said third intended location value to the first end of the object at the new screen location;

determining an intended length of the object based on said first and second intended location values assigned to the first and second ends of the object when at the original screen location, the object having an original displayed length measured from said first mark to said second mark; and resizing the object to a new displayed length on the screen after the object is moved to the new screen location by calculating said new displayed length based on said third intended location value and on said intended length of the object, such that even if said original displayed length when at the original screen location is different from said new displayed length when at the new screen location, said intended length of the object remains unchanged.

* * * * *